June 5, 1956
H. H. WINEGAR
2,748,761
GRINDING WHEEL TOOLS
Filed April 1, 1952
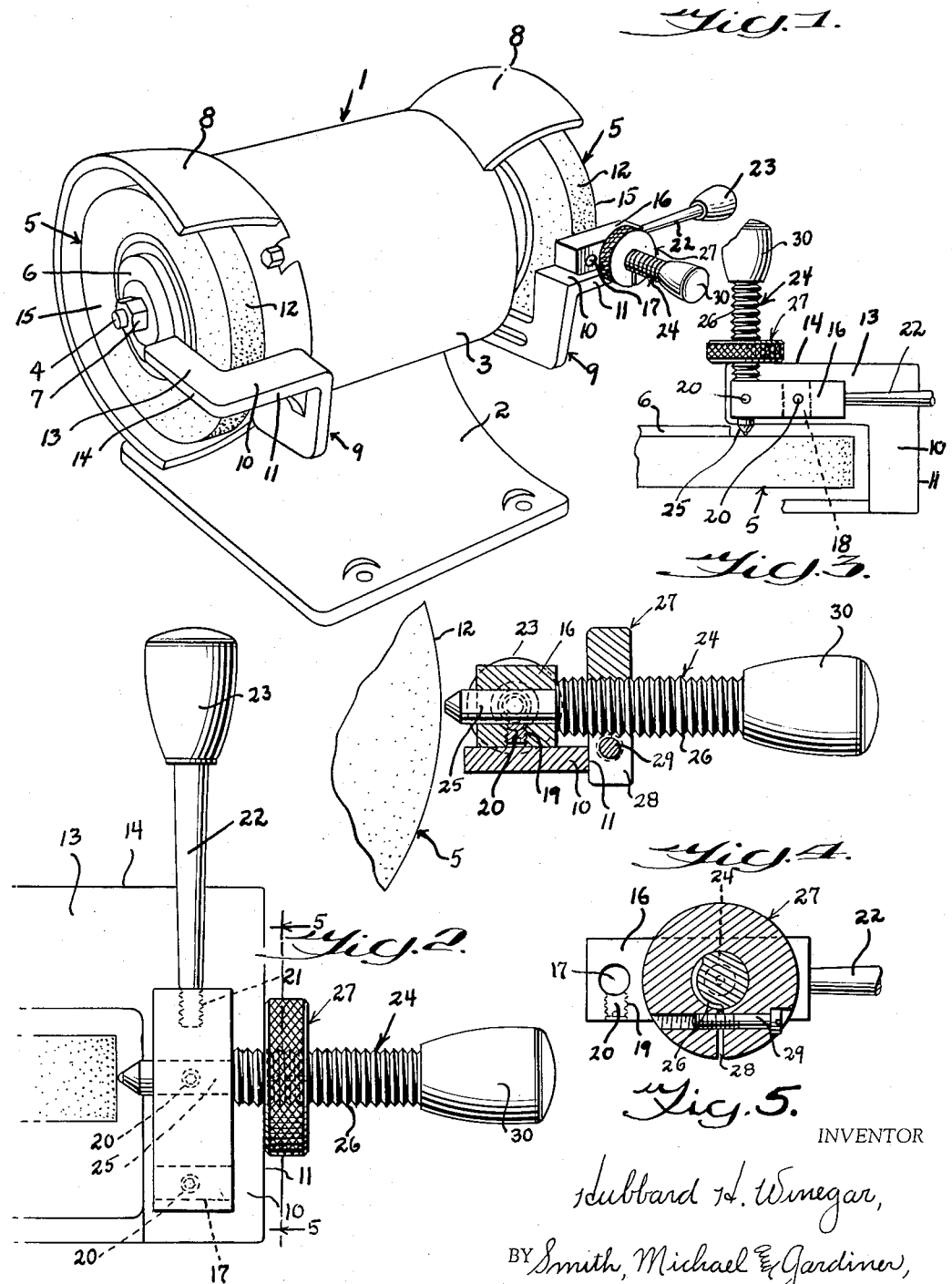
INVENTOR
Hubbard H. Winegar,
BY Smith, Michael & Gardiner,
ATTORNEY

United States Patent Office 2,748,761
Patented June 5, 1956

2,748,761

GRINDING WHEEL TOOLS

Hubbard H. Winegar, Ormond Beach, Fla.

Application April 1, 1952, Serial No. 279,865

7 Claims. (Cl. 125—11)

My invention relates to grinding wheel tools, and has particular reference to a portable tool for dressing or truing the work face or faces of grinding or abrading wheels of the type generally employed in the rough, semi-precision, or precision grinding of metals or other materials.

It is an object of my invention to provide a portable grinding wheel tool which is adapted to be supported on and guided by the conventional work rest usually employed with grinding or abrading wheels and located closely adjacent the working face or faces thereof, and which tool is adapted to be moved back and forth across said working face or faces during the dressing or truing operation.

It is an object of my invention to provide a portable grinding wheel tool which is adapted to be supported on and guided by the conventional, L-shaped work rest usually employed with grinding or abrading wheels and having a front portion and a side portion located closely adjacent the peripheral work face and a radial work face, respectively, of said wheel, and which tool is supported on and guided by the front portion of said rest during the dressing or truing of the peripheral work face of said wheel, and is supported on and guided by the side portion of said rest during the dressing or truing of the radial work face of said wheel.

It is a further object of my invention to provide a portable grinding wheel tool of the character above described in which the wheel-dressing or truing cutter comprises an elongated member having a cutting point or tip at one end thereof and a threaded shank portion adjacent the other end thereof, and in which a nut is adjustable along the length of said threaded shank portion and slidably engages an edge of the associated work rest, the engagement of said nut with said edge serving to guide said tool as it is moved back and forth across the working face of the wheel, and the position of said nut on said threaded shank portion determining the depth of cut of said dressing or truing cutter.

It is a further object of my invention to provide a portable grinding wheel tool of the character above described and including a tool supporting block having a plurality of spaced passages extending transversely therethrough, one passage located adjacent an end of said block and another located at approximately the longitudinal center portion of said block, which passages are adapted to receive selectively and retain therein the elongated cutter member of said tool, said elongated cutter member being positioned in said centrally located passage when the tool is to be used for dressing or truing the peripheral work face of said wheel and being positioned in said end passage when the tool is to be used for dressing or truing the radial work face of said wheel, the positioning of said cutter member within said end passage permitting dressing or truing of substantially the entire radial work face of the wheel without said block or tool coming in contact with the spindle on which the wheel is mounted or the nut and washer usually employed for securing the wheel on the spindle.

It is a still further object of my invention to provide a portable grinding wheel tool of the character above described and including handle portions for engagement by the hands of an operator to enable said operator properly to guide the tool as it is moved back and forth across the work face of the wheel and to permit the operator to steady the tool on the work rest during the dressing or truing operation to avoid "tool chatter" and the resulting imposition of shock loads on the cutting point or tip of the tool.

It is a still further object of my invention to provide a portable grinding wheel tool that is strong and durable, which consists of a minimum number of parts, which is relatively cheap and easy to manufacture, which is relatively simple to assemble, adjust, and operate, and which is highly efficient in the purposes for which it is designed.

In the accompanying drawings wherein, for the purpose of illustration, I have shown a preferred embodiment of my invention:

Fig. 1 is a perspective view of a bench type grinder of more or less standard or conventional construction and showing my improved, portable grinding wheel tool in position on a work rest during the dressing or truing of the peripheral work face of one of the grinding or abrading wheels thereof, Fig. 2 is an enlarged, fragmentary, plan view showing the relationship between my improved, portable grinding wheel tool, the work rest of the grinder, and the peripheral work face of the grinding or abrading wheel, Fig. 3 is a fragmentary, plan view showing the relationship between my improved, portable grinding wheel tool, the work rest of the grinder, and the radial work face of the grinding or abrading wheel, Fig. 4 is an enlarged, fragmentary view with the supporting and adjusting means shown in vertical section and the elongated cutter member shown in full lines, and Fig. 5 is a fragmentary, cross-sectional view taken on the line 5—5 of Fig. 2.

Referring more in detail to the accompanying drawings, wherein like reference numerals have been employed to designate like parts throughout the several views, the numeral 1 designates a motor-driven, bench type grinder of more or less standard or conventional form, including a base portion 2, a motor housing 3, an axially-extending spindle driven by the motor within housing 3 and having end portions 4, 4 extending outwardly at opposite ends of said motor housing, each of these outwardly-extending end portions having a grinding or abrading wheel 5 secured thereon by the conventional retaining washer 6 and retaining nut 7. Secured to each end of the motor housing 3 is an arcuate guard member 8 which embraces the major portion of the peripheral work face of the wheel 5, with an unguarded portion of said wheel exposed at each end of the grinder. Located adjacent each wheel 5 in a work rest 9 having straight, outer edges and substantially L-shaped in plan, and including a flat, front portion 10 having a straight, outer edge 11 parallel with the peripheral face 12 of the wheel 5 and including a flat, side portion 13 having a straight outer edge 14 parallel with the radial face 15 of said wheel. Each work rest 9 is adjustably mounted on an end portion of the motor housing 3 so that it may be moved and clamped in various positions with respect to its adjacent grinding or abrading wheel 5. The construction and operation of the grinder just described are old and well known in the art and form no part of my present invention. I have merely selected this type of bench grinder to illustrate the relationship between a grinding or abrading wheel 5 and the front and side portions 10 and 13, respectively, of an L-shaped work rest.

The improved, portable, grinding wheel tool of my present invention includes a tool supporting block 16 having a plane bottom surface and having a first passage 17 extending transversely through the block near one end thereof and a second passage 18 extending transversely through the block at approximately the longitudinal center portion thereof, these passages preferably being parallel to each other and preferably parallel to the plane bottom surface of said block. Each of said passages is intersected intermediate the ends thereof by a passage 19 defined by a threaded bore extending upwardly from the bottom surface of the block 16 and adapted to receive therein a set screw 20 for the purpose to be hereinafter described. The end of block 16 which is opposite the end in which the first transverse passage 17 is formed is provided with a threaded socket 21 engaged by the threaded end of a handle 22 which terminates at its outer end in a knob 23. Handle 22 is preferably straight and preferably extends outwardly from the block 16 substantially on the longitudinal axis of said block and provides a rigid member adapted to be grasped and held by an operator, as will be more fully described.

The wheel dressing or truing member of my improved grinding wheel tool comprises an elongated, cylindrical member 24 having its inner end portion 25 reduced in diameter with respect to the diameter of the remaining portion of said member and being of a diameter corresponding substantially with the diameters of the passages 17 and 18 in block 16, said reduced portion 25 being of a length such that the inner end of said reduced portion extends for a short distance beyond the inner side face of block 16, as clearly shown in the accompanying drawings, the terminal end or tip of this reduced portion being provided with a cutting point such as a diamond or other hard substance capable of dressing or truing a grinding or abrading wheel of conventional or ordinary hardness and composition. The remaining portion of elongated, cylindrical member 24 is threaded as indicated at 26, the pitch of the threads 26 being determined by the speed at which it is desired to effect the necessary adjustment of the cutter member just described, and while I have shown the thread 26 as being of relatively coarse pitch, it is to be understood that this thread may be of finer pitch so as to effect a fine adjustment, having in mind that in the operation of diamond and like dressing and truing tools, cuts made on the wheel should not exceed a depth of the order of .001 inch to insure against overloading of the diamond.

A nut or abutment 27 is threadedly engaged on the threaded portion 26 of cylindrical member 24, this nut or abutment having a knurled or roughened periphery, and having a radial slot 28 extending from its bore to its periphery. The nut or abutment 27 is normally freely rotatable on member 24, the threaded engagement between these two members causing said nut or abutment to travel along said threaded portion from end to end thereof, the direction of travel depending upon the direction of rotation imparted to said nut or abutment and the speed of travel depending upon the pitch of the interengaging threads on the nut or abutment 27 and on the threaded portion 26 of member 24. As an effective means for clamping the nut or abutment 27 in a fixed position on the threaded portion 26 of member 24, i. e. to prevent relative rotation between said nut or abutment and said member, I provide a transverse passage 28a through said nut or abutment 27, which passage extends in a direction normal to that of the walls defining the slot 28, this passage having its defining walls threaded to receive therein a bolt 29. When bolt 29 is tightened, the walls defining slot 28 are forced toward one another, thus rigidly clamping the nut or abutment 27 on the member 24 and preventing relative rotation therebetween. When bolt 29 is loosened, the inherent resiliency of the nut or abutment 27 will permit the walls defining slot 28 to separate, thus permitting said nut or abutment 27 to be rotated freely relative to the member 24. The end of member 24 opposite that at which the reduced portion 25 is located is provided with a knob 30 so that member 24 provides a handle to be grasped and held by an operator, as will be more fully described.

Having thus described the construction of my improved grinding wheel tool, I will now describe the operation of the same. As above stated, the tool is adapted for dressing or truing a grinding or abrading wheel and is adapted to be supported by and guided by the conventional work rest usually employed with such wheels. While the tool of my present invention finds utility as a means for dressing or truing wheels having a substantially L-shaped work rest associated therewith, it is equally well adapted for dressing or truing the peripheral work face of a wheel which has a straight work rest which extends only across the peripheral work face of the wheel, or for dressing or truing the radial work face of a wheel which has a straight work rest which extends only across the radial work face of the wheel.

The operator places the tool on the flat upper surface 10 of the work rest 9 with the flat bottom surface of block 16 resting on said flat upper surface. The member 24 has its reduced portion 25 inserted in passage 18 and is rigidly clamped thereon by set screw 20. Bolt 29 is loose within its threaded passage 28a so that nut or abutment 27 may be freely rotated along the length of threaded portion 26 of member 24. The entire tool is moved toward the peripheral work face 12 of wheel 5 until the cutting tip of said tool contacts the highest point on said peripheral work face, whereupon the nut or abutment 27 is rotated until it abuts the straight edge 11 of work rest 10. The bolt 29 is then tightened rigidly to retain the said nut or abutment in its adjusted position. The tool is now ready for the dressing or truing operations, and the motor is started to effect rotation of wheel 5.

The operator grasps the knobs 23 and 30 and imparts a reciprocating motion to the tool in a direction parallel to the peripheral work face 12, to traverse the cutting edge of said tool back and forth across the rotating peripheral work face 12, the block 16 sliding freely across the upper surface 10 of the work rest during such reciprocating movements of the tool. The inner flat face of nut or abutment 27 slidably engages the straight edge 11 of the work rest 9 and effectively guides the tool during the dressing or truing operation, inward pressure being exerted on the tool through the knob 30 to retain the nut or abutment in contact with the said straight edge.

When the highest point or points on the peripheral work face 12 have been cut down by the cutting tip of the tool, the bolt 29 is loosened and the nut or abutment is rotated a part revolution or more to move the same a slight distance toward the outer end of member 24, having in mind that for the most satisfactory results, cuts of the order of .001 inch are preferable to prevent overloading of the cutting tip, usually a diamond or other extremely hard material capable of cutting the surface of the wheel. Bolt 29 is again tightened and the tool is again traversed back and forth across the peripheral work face 12 of the wheel, the block 16 sliding along the upper, flat surface 10 of the work rest 9 and the inner surface of nut or abutment 27 slidably engaging the front edge 11 of said work rest and being properly guided during the reciprocating movements of the tool. Plenty of coolant is preferably supplied between the cutting tip of the tool and the work face 12, for, as is well known in the art, a cool cutting tool more effectively performs its intended function. After several cuts have been made, the bolt 29 is again loosened, and the nut or abutment 27 is again rotated a part revolution or more to move the same a slight distance, say approximately .001 inch, toward the outer end of member 24, whereupon bolt 29 is again tightened and a further cut is made on the peripheral work face 12 of the wheel. These operations are repeated until the work face 12 is properly dressed.

When it is desired to dress or true the radial work face 15 of a wheel having a radially disposed work rest 13 extending along the side thereof, the set screw 20 is loosened, the cylindrical member 24 is withdrawn from passage 18 and the reduced portion 25 of said member is inserted into end passage 17, being securely clamped therein by set screw 20. The tool is then adjusted for the proper depth of cut, is moved back and forth across the radial work face of the wheel, is readjusted, and is moved back and forth again, these operations being repeated until the said radial face 15 is properly dressed, all as fully explained above in connection with the dressing or truing of the peripheral work face of the wheel. It is to be particularly noted (see Fig. 3) that during the dressing or truing of the radial face 15, the cutter may be employed to dress or true substantially the entire radial work face of the wheel between the periphery of washer 6 and the periphery of said wheel without interference with the washer 6, retaining nut 7, or projecting shaft section 4, this being made possible by the positioning of the member 24 within the end passage 17.

By virtue of the construction and operation just described, it is possible effectively and efficiently to dress or true the peripheral and/or radial work faces of a grinding or abrading wheel with a minimum of skill and effort, with the expenditure of a minimum of time, and without removing the wheel from its operating spindle or disturbing the position of the work rest. An accurate dressing or truing of the wheel is assured due to the proper guiding of the tool by its sliding contact with the outer, straight edge of the work rest, the tool being slidably supported during its reciprocating movements by engagement of the block 16 with the upper, flat faces 10 and 13 of the work rest 9.

It is to be understood that the form of my invention shown and described herein is to be taken as a preferred embodiment thereof, and that various changes may be made in the relative size, shape, and arrangement of parts without departing from the spirit of my invention or the scope of the subjoined claims.

Having thus described my invention, I claim:

1. In combination, a grinding wheel having two flat sides and a peripheral surface all of which may be used for grinding; a work rest having an angular shape with two vertical edges at right angles to each other and with flat upper horizontal surfaces; means for securing said work rest immovably adjacent said grinding wheel with one of said vertical edges parallel to a tangent to the periphery of the grinding wheel and with the other vertical edge parallel to one of the flat sides of the grinding wheel; a block resting on and slidable over the flat upper surfaces of said work rest and having two parallel, transverse horizontal passages, one in the middle thereof and the other near one end of said block; an abutment adjustably supported on but spaced from said block and having a flat vertical surface which is in slidable contact with either vertical edge of said work rest; a cutting tool supported on and projecting from said block, said cutting tool having a slidable fit in a selected one of said passages and having its cutting end in substantial contact with the grinding wheel, the other end of said cutting tool having a handle extending outwardly beyond the block and parallel to or in the plane of the grinding wheel when the vertical edge which is parallel to said tangent is contacted by said abutment, said handle extending at right angles to the plane of the grinding wheel when the vertical edge which is parallel to one of the flat sides of the grinding wheel is contacted by said abutment, and a second handle fixed to the end of the block opposite to the end which is near said transverse passage and extending outwardly from the block to cooperate with the first named handle in manual sliding of said block over the flat upper surfaces of said work rest while the selected surface of the grinding wheel is being dressed by the cutting tool; means to secure the cutting tool immovably on the block; and means to secure the abutment immovably in adjusted position, said abutment being adjusted to determine the position of the block and of the cutting tool carried by the block relative to the surface of the grinding wheel which is to be dressed.

2. In combination, a grinding wheel having two flat sides and a peripheral surface all of which may be used for grinding; a work rest having an angular shape with two vertical edges at right angles to each other and with flat upper horizontal surfaces; means for securing said work rest immovably adjacent said grinding wheel with one of said vertical edges parallel to a tangent to the periphery of the grinding wheel and with the other vertical edge parallel to one of the flat sides of the grinding wheel; a block resting on and slidable over the flat upper surfaces of said work rest; an abutment adjustably supported on but spaced from said block and having a flat vertical surface which is in slidable contact with either vertical edge of said work rest; a cutting tool supported on and projecting from said block, said cutting tool including a straight elongated cylindrical member having its inner end portion reduced in diameter, said block having a transverse passage which slidably receives said inner end portion of reduced diameter, the terminal end of said reduced end portion being provided with a cutting point, the remaining portion of the elongated cylindrical member having screw threads and a knob or handle on the outer end, said abutment having threads so that it may be adjusted longitudinally of the elongated cylindrical member by manual turning; means to secure the cutting tool immovably on the block; and means to secure the abutment immovably in adjusted position, said abutment being adjusted to determine the position of the block and of the cutting tool carried by the block relative to the surface of the grinding wheel which is to be dressed.

3. In combination, a grinding wheel having two flat sides and a peripheral surface all of which may be used for grinding; a work rest having an angular shape with two vertical edges at right angle to each other and with flat upper horizontal surfaces; means for securing said work rest immovably adjacent said grinding wheel with one of said vertical edges parallel to a tangent to the periphery of the grinding wheel and with the other vertical edge parallel to one of the flat sides of the grinding wheel, said work rest being so dimensioned that the vertical edge which is parallel to the flat side of the grinding wheel extends from a point beyond the periphery of the grinding wheel to a point a short distance from the rotational axis of the grinding wheel; a block resting on and slidable over the flat upper surfaces of said work rest; an abutment supported on but spaced from said block and having a flat vertical surface which is in slidable contact with either vertical edge of said work rest; a cutting tool supported on and projecting from said block; means to secure the cutting tool immovably on the block; means to secure the abutment immovably in adjusted position, said abutment being adjusted to determine the position of the block and of the cutting tool carried by the block relative to the surface of the grinding wheel which is to be dressed; a handle secured to one end of the block and extending outwardly therefrom; and a second handle affixed to the cutting tool at its outer end.

4. A grinding wheel tool for dressing a work face of a grinding wheel mounted for rotation about its central axis comprising, in combination, a fixed work rest adjacent said work face and having a straight edge which is generally parallel to the work face; an elongated block slidably supported on said work rest and having a straight, transverse passage therethrough; a straight cutting tool detachably carried by said block and having a cutting tip at one end engaging said work face, said cutting tool having a slidable fit in said straight, transverse passage in said block; means to secure the cutting tool immovably directly on said block; an abutment adjustably secured upon said tool and slidably engaging said edge of said work rest and acting as a gauge member to determine the depth of cut of the cutting tip on said work face; and a handle fixed on and projecting from said block to facilitate manual reciprocation of said block on said work rest while dressing the grinding wheel.

5. A grinding wheel tool for dressing a work face of a grinding wheel mounted for rotation about its central axis comprising, in combination, a fixed work rest adjacent said work face and having a straight edge which is generally parallel to the work face; an elongated block slidably supported on said work rest and having a plurality of straight, parallel, transverse passages therethrough; a cutting tool detachably carried by said block and having a cutting tip at one end engaging said work face, said cutting tool being selectively insertable in any one of said passages; a handle on the end of said cutting tool which is opposite the cutting tip to facilitate insertion and withdrawal of said tool into and from said passages; means to secure the cutting tool immovably directly on said block and within one of said passages; an abutment adjustably secured upon said tool and slidably engaging said edge of said work rest and acting as a gauge member to determine the depth of cut of the cutting tip on said work face; and a handle fixed on and projecting from said block to facilitate manual reciprocation of said block on said work rest while dressing the grinding wheel.

6. A grinding wheel tool for dressing a work face of a grinding wheel mounted for rotation about its central axis comprising, in combination, a fixed work rest adjacent said work face and having a straight edge which is generally parallel to the work face; an elongated block slidably supported on said work rest and having a first transverse passage extending through approximately the longitudinal center portion of said block and a second transverse passage extending through said block adjacent an end thereof, said passages being substantially parallel to each other; a cutting tool detachably carried by said block and having a cutting tip at one end engaging said work face, said cutting tool being selectively insertable in either said first or second passage; means for detachably retaining said cutting tool in the selected passage with the cutting tip of said tool extending outwardly of a face of said block; an abutment adjustably secured upon said tool and slidably engaging said edge of said work rest and acting as a gauge member to determine the depth of cut of the cutting tip on said work face; and a handle fixed on and projecting from said block to facilitate manual reciprocation of said block on said work rest while dressing the grinding wheel.

7. A grinding wheel tool as defined in claim 6 in which the handle extends outwardly from one end of the block substantially in alignment with the longitudinal axis of the block, and in which the second transverse passage is located adjacent that end of the block opposite to that from which said handle extends.

References Cited in the file of this patent

UNITED STATES PATENTS

| | | |
|---|---|---|
| 354,690 | Cleary | Dec. 21, 1886 |
| 1,227,398 | Perez | May 22, 1917 |
| 1,293,048 | Koning | Feb. 4, 1919 |
| 1,320,462 | Fowler | Nov. 4, 1919 |
| 1,357,814 | Olson | Nov. 2, 1920 |
| 1,473,520 | Rosak | Nov. 6, 1923 |
| 1,772,345 | Flygare | Aug. 5, 1930 |
| 1,775,124 | Fryckberg | Sept. 9, 1930 |
| 2,344,385 | Beaudet | Mar. 14, 1944 |
| 2,355,324 | Palmer | Aug. 8, 1944 |
| 2,437,599 | Greeley | Mar. 9, 1948 |